United States Patent
Moy et al.

[11] Patent Number: 6,159,892
[45] Date of Patent: Dec. 12, 2000

[54] CATALYST SUPPORTS, SUPPORTED CATALYSTS AND METHODS OF MAKING AND USING THE SAME

[75] Inventors: David Moy, Winchester, Mass.; Robert Hoch, Hensonville, N.Y.

[73] Assignee: Hyperion Catalysis International, Inc., Cambridge, Mass.

[21] Appl. No.: 08/447,355

[22] Filed: May 23, 1995

Related U.S. Application Data

[62] Division of application No. 08/320,564, Oct. 11, 1994, Pat. No. 5,569,635, which is a continuation of application No. 07/887,314, May 22, 1992, abandoned.

[51] Int. Cl.$^7$ .............. B01J 21/18; B01J 27/06; D01C 5/00; D01F 9/12
[52] U.S. Cl. .............. 502/174; 502/180; 502/182; 423/447.3; 208/46
[58] Field of Search .............. 502/180, 182, 502/174; 423/447.3; 208/46

[56] References Cited

U.S. PATENT DOCUMENTS

| | | | |
|---|---|---|---|
| 5,102,647 | 4/1992 | Yamada et al. | 423/447.3 |
| 5,165,909 | 11/1992 | Tennent et al. | 423/447.1 |
| 5,171,560 | 12/1992 | Tennent | 423/447.3 |
| 5,569,635 | 10/1996 | Moy et al. | 502/185 |
| 5,578,543 | 11/1996 | Tennent et al. | 502/180 |
| 5,589,152 | 12/1996 | Tennent et al. | 423/447.3 |
| 5,650,370 | 7/1997 | Tennent et al. | 502/174 |
| 5,691,054 | 11/1997 | Tennent et al. | 428/359 |
| 5,726,116 | 3/1998 | Moy et al. | 502/182 |

FOREIGN PATENT DOCUMENTS

| | | | |
|---|---|---|---|
| 15754 | 6/1975 | Japan | 502/184 |
| 18878 | 7/1975 | Japan | 502/184 |
| 114743 | 6/1986 | Japan | 502/185 |
| WO 87/07559 | 12/1987 | WIPO | 502/185 |

*Primary Examiner*—Mark L. Bell
*Assistant Examiner*—Patricia L. Hailey
*Attorney, Agent, or Firm*—Kramer Levin Naftalis & Frankel LLP

[57] ABSTRACT

A supported catalyst comprising a carbon fibril aggregate and a catalytically effective amount of a catalyst supported therein, a process for performing a catalytic reaction in fluid phase using the supported catalyst and a process for making the supported catalyst are disclosed.

31 Claims, 1 Drawing Sheet

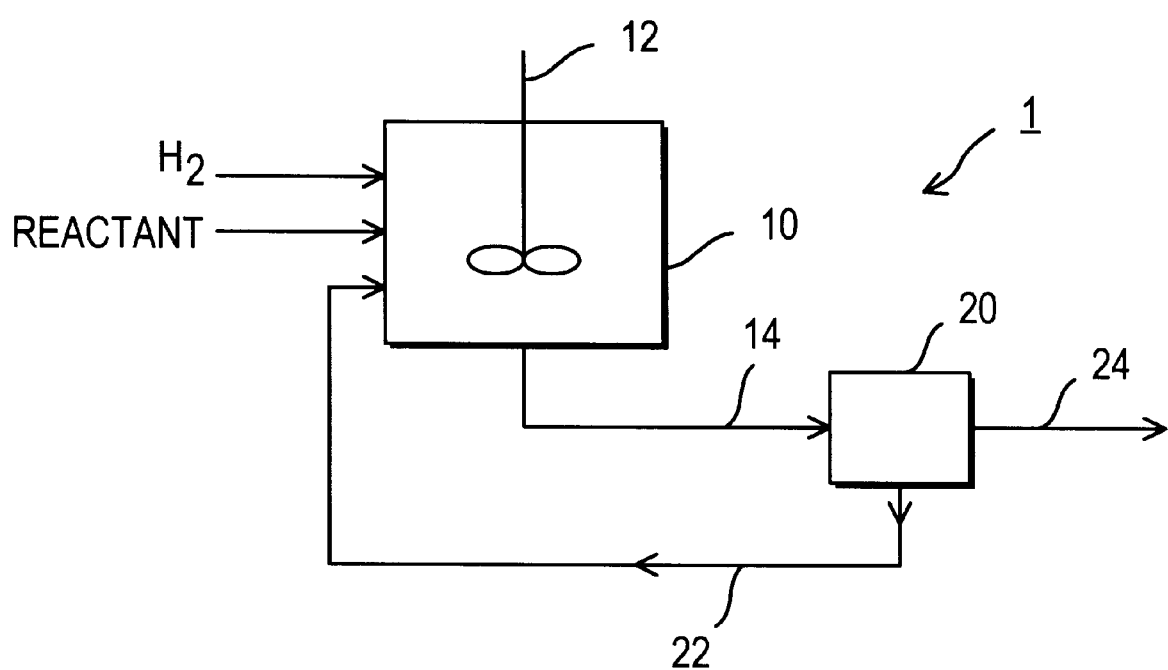
*THE FIGURE*

CATALYST SUPPORTS, SUPPORTED CATALYSTS AND METHODS OF MAKING AND USING THE SAME

This application is a division of application Ser. No. 08/320,564, filed Oct. 11, 1994, now U.S. Pat. No. 5,569,635, which is a continuation of application Ser. No. 07/887,314, filed May 22, 1992, now abandoned.

BACKGROUND OF THE INVENTION

The invention relates to catalyst supports, supported catalysts and methods of making and using them in heterogeneous catalytic reactions.

Heterogeneous catalytic reactions are widely used in chemical processes in the petroleum, petrochemical and chemical industries. Such reactions are commonly performed with the reactant(s) and product(s) in the fluid phase and the catalyst in the solid phase. In heterogeneous catalytic reactions, the reaction occurs at the interface between phases, i.e., the interface between the fluid phase of the reactant(s) and products(s) and the solid phase of the supported catalyst. Hence, the properties of the surface of a heterogeneous supported catalyst are significant factors in the effective use of that catalyst. Specifically, the surface area of the active catalyst, as supported, and the accessibility of that surface area to reactant chemisorption and product desorption are important. These factors affect the activity of the catalyst, i.e., the rate of conversion of reactants to products. The chemical purity of the catalyst and the catalyst support have an important effect on the selectivity of the catalyst, i.e., the degree to which the catalyst produces one product from among several products, and the life of the catalyst.

Generally catalytic activity is proportional to catalyst surface area and high specific area is therefore desirable. However, that surface area must be accessible to reactants and products as well as to heat flow. The chemisorption of a reactant by a catalyst surface is preceded by the diffusion of that reactant through the internal structure of the catalyst and the catalyst support, if any. The catalytic reaction of the reactant to a product is followed by the diffusion of the product away from the catalyst and catalyst support. Heat must be able to flow into and out of the catalyst support as well.

Since the active catalyst compounds are often supported on the internal structure of a support, the accessibility of the internal structure of a support material to reactant(s), product(s) and heat flow is important. Porosity and pore size distribution are measures of that accessibility. Activated carbons and charcoals used as catalyst supports have surface areas of about 1000 square meters per gram and porosities of less than one milliliter per gram. However, much of this surface area and porosity, as much as 50%, and often more, is associated with micropores, i.e., pores with pore diameters of 2 nanometers or less. These pores can be inaccessible because of diffusion limitations. They are easily plugged and thereby deactivated. Thus, high porosity material where the pores are mainly in the mesopore (>2 nanometers) or macropore (>50 nanometers) ranges are most desirable.

It is also important that supported catalysts not fracture or attrit during use because such fragments may become entrained in the reaction stream and must then be separated from the reaction mixture. The cost of replacing attritted catalyst, the cost of separating it from the reaction mixture and the risk of contaminating the product are all burdens upon the process. In other processes, e.g. where the solid supported catalyst is filtered from the process stream and recycled to the reaction zone, the fines may plug the filters and disrupt the process.

It is also important that a catalyst, at the very least, minimize its contribution to the chemical contamination of reactant(s) and product(s). In the case of a catalyst support, this is even more important since the support is a potential source of contamination both to the catalyst it supports and to the chemical process. Further, some catalysts are particularly sensitive to contamination that can either promote unwanted competing reactions, i.e., affect its selectivity, or render the catalyst ineffective, i.e., "poison" it. Charcoal and commercial graphites or carbons made from petroleum residues usually contain trace amounts of sulfur or nitrogen as well as metals common to biological systems and may be undesirable for that reason.

While activated charcoals and other carbon-containing materials have been used as catalyst supports, none have heretofore had all of the requisite qualities of porosity and pore size distribution, resistance to attrition and purity for the conduct of a variety of organic chemical reactions.

OBJECTS OF THE INVENTION

It is therefore a primary object of the invention to provide improved catalyst supports and supported catalysts for heterogeneous catalytic reactions for use in chemical processes in the petroleum, petrochemical and chemical industries.

It is a further object of the invention to provide improved, substantially pure, carbon catalyst support of high porosity, purity and resistance to attrition.

It is another object of the invention to improve the activity and selectivity of supported catalysts.

It is still a further object of the invention to provide improved methods for preparing supported catalysts.

It is still a further and related object of the invention to improve the economics and reliability of making and using supported catalysts.

SUMMARY OF THE INVENTION

The invention is in a supported catalyst for conducting a fluid phase catalytic chemical reaction, processes for performing a catalytic chemical reaction in fluid phase using the supported catalyst and a process for making the supported catalyst.

The supported catalyst of the invention comprises a support comprising a carbon fibril aggregate and a catalytically effective amount of a catalyst supported thereon. The fibril aggregates comprise a plurality of carbon fibrils, each comprising multiple, essentially continuous, generally parallel layers of ordered graphitic carbon. In a preferred embodiment these graphitic layers are disposed in substantially parallel relation to the central axis of the fibril and a preponderance of the fibrils have an external diameter of about 3.5 to 75 nanometers and a length-to-diameter ratio of at least about 5.

Fibril-aggregate-supported catalysts of the present invention have unique properties. They are exceptionally macroporous and they are pure and they are resistant to attrition and consequently can be separated from a fluid phase reaction medium over a long service life. The uniquely high macroporosity of carbon fibril aggregates, the result of their macroscopic morphology, greatly facilitates the diffusion of reactants and products and the flow of heat into and out of the supported catalyst. This unique porosity results from a random entanglement or intertwining of fibrils that generates an unusually high internal void volume comprising mainly macropores in a dynamic, rather than static state. Sustained separability from fluid phase and lower losses of catalyst as fines also improves process performance and economics. Other advantages of the fibril aggregates as catalyst supports include high purity, improved catalyst loading capacity and chemical resistance to acids and bases.

BRIEF DESCRIPTION OF THE DRAWINGS

The FIGURE is a schematic diagram of a catalytic reaction process performed with fibril-aggregate supported catalysts of the invention.

DETAILED DESCRIPTION OF THE INVENTION

The carbon fibril aggregates used as catalyst supports in the invention are formed of a plurality of carbon fibrils characterized by an outer region of multiple, essentially continuous, generally parallel layers of ordered graphitic carbon atoms. The orientation of these layers with respect to the central axis of the fibril may vary from substantially parallel i.e. 0° angle of inclination to substantially perpendicular i.e., 90° angle of inclination.

In a preferred embodiment of the invention, the layers of graphitic carbon are in a substantially parallel relationship and a preponderance of fibrils have an external diameter of about 3.5 to about 75 nanometers, a length-to-diameter ratio of at least about 5 and preferably at least 100 or even 1000.

Such carbon fibrils are described in Tennent et al., U.S. Ser. No. 871,676, filed Jun. 6, 1986 ("Novel Carbon Fibrils, Method for Producing Same and Compositions Containing Same"), refiled as continuation application Ser. No. 593,319, filed Oct. 1, 1990, now U.S. Pat. No. 5,165,909, issued Nov. 24, 1992, Tennent et al., U.S. Ser. No. 871,675, filed Jun. 6, 1986 ("Novel Carbon Fibrils, Method for Producing Same and Encapsulated Catalyst"), refiled as continuation application Ser. No. 492,365, filed Mar. 9, 1990, now U.S. Pat. No. 5,171,560, issued Dec. 15, 1992, Snyder et al., U.S. Ser. No. 149,573 filed Jan. 28, 1988 ("Carbon Fibrils"), refiled as continuation application Ser. No. 494,894, filed Mar. 13, 1990, refiled as continuation application Ser. No. 694,244, filed May 1, 1991, now U.S. Pat. No. 5,707,916, Mandeville et al., U.S. Ser. No. 285,817 filed Dec. 16, 1988 ("Fibrils"), refiled as continuation application Ser. No. 08/284,755, filed Aug. 2, 1994, now abandoned, and McCarthy et al., U.S. Ser. No. 351,967 filed May 15, 1989 ("Surface Treatment of Carbon Microfibers"), refiled as continuation application Ser. No. 823,021, filed on Jan. 15, 1992, refiled as continuation application Ser. No. 117,873, filed on Sep. 7, 1993 (now abandoned), refiled as continuation application Ser. No. 08/329,774, filed Oct. 27, 1994, all of which are assigned to the same assignee as the invention here and are hereby incorporated by reference. Other carbon fibrils include those having a fishbone morphology ("FB") as described in U.S. Pat. No. 4,855,091 to Geus et al.

Carbon fibril aggregates of the invention have a variety of macroscopic morphologies as determined by scanning electron microscopy, including bird nest ("BN"), combed yarn ("CY") and open net ("ON"). Bird nest aggregates resemble bird nests and are characterized by individual carbon fibrils randomly entangled with each other to form entangled balls of carbon fibrils. Combed yarn aggregates resemble combed yarn and are comprised of bundles of straight to slightly bent or kinked carbon fibrils having substantially the same relative orientation with respect to each other. In other words, the longitudinal axis of each carbon fibril, despite individual bends or kinks, extends in the same general direction as that of the surrounding fibrils in the bundles. Open net aggregates resemble an open net and comprise straight to slightly bent or kinked carbon fibrils that are loosely entangled with each other. Open net aggregates have a degree of fibril entanglement that is greater than that observed in combed yarn aggregates in which the individual fibrils have substantially the same relative orientation, but that is less than that of bird nest aggregates. Combed yarn and open net aggregates are more readily dispersed than bird nest aggregates.

The random entanglement of fibrils in the bird nest (BN) morphology or the partially (loosely) intertwined fibrils in the combed yarn (CY) morphology results in a unique porosity and pore structure. Since the individual fibrils are in the range of 3.5–70 nanometers in diameter, the pores formed by the entangled or loosely intertwined strands are of comparable dimensions. Additionally, since the strands are not chemically or physically attached other than by relatively weak van der Waals attractions intermittently spaced, some movement of the strands or portions of the strands relative to each other can occur either randomly or on demand. Thus, the pores are in a "dynamic" rather than static state. This results in a support where traditional micropores (<20 Å) are non-existent, and where the entire porosity is available to the fluid medium as meso- or macropores. This is highly advantageous for performing catalytic reactions.

According to one preferred embodiment, the aggregates have a diameter between 0.05 and 50 microns and a length between 0.1 and 1000 microns.

Carbon fibril aggregates are prepared by contacting a carbon-containing gas with a metal catalyst in a reactor at temperature and other conditions sufficient to produce them with the above-described fibril structure and macroscopic aggregate morphology. Reaction temperatures are 400–850° C., more preferably 600–750° C. Fibril aggregates are preferably prepared continuously by bringing the reactor to the reaction temperature, adding supported metal catalyst particles, and then continuously contacting the supported catalyst with the carbon-containing gas. Examples of suitable feed gases include aliphatic hydrocarbons, e.g., ethylene, propylene, propane, and methane; carbon monoxide; aromatic hydrocarbons, e.g., benzene, naphthalene, and toluene; and oxygenated hydrocarbons. Additionally, hydrogen may be included in the feed. Preferred catalysts contain iron and, preferably, at least one element chosen from Group VIB of the Periodic Table (CAS Version) (e.g., molybdenum, tungsten, or chromium), Group VIIA (e.g., manganese), or the Lanthanide Series (e.g., cerium).

The macroscopic morphology of the fibril aggregate, i.e., whether it is a combed yarn, open net or bird nest, is controlled by the choice of the catalyst support that is used in producing the fibril aggregate. Spherical supports grow carbon fibrils in random directions leading to the formation of bird nest aggregates. Combed yarn and open net aggregates are prepared using supports having one or more readily cleavable planar surfaces, e.g., an iron or iron-containing metal catalyst particle deposited on a support material having one or more readily cleavable surfaces and a surface area of at least 1 $m^2/g$.

Preferred support materials for making fibril aggregates include spherical fumed alumina and activated alumina or magnesia in the form of aggregates of tabular, prismatic, or platelet crystals. Such material is commercially available, e.g., spherical fumed alumina from DeGussa, activated alumina from Strem Chemicals and magnesia from Alfa Inorganics. The spherical fumed alumina particles yield primarily bird nest aggregates, while the activated alumina supports yield primarily combed yarn aggregates and the magnesia supports yield primarily open net aggregates.

It is believed that in the formation of combed yarn and open net fibril aggregates that deposition of a catalyst on a support comprising readily cleavable planar surfaces allows the carbon fibrils to assist each other as they grow, creating a "neighbor" effect. As the catalyst particles deposited on the flat surfaces initiate carbon fibril growth, the individual fibrils are influenced by their "neighbors". In the case of the activated alumina support, this leads primarily to combed yarn fibril aggregates in which the individual fibrils have the same relative orientation. The magnesia supports, although having readily cleavable planar surfaces, yield primarily open net fibril aggregates in which the carbon fibrils are lightly entangled because the magnesia support breaks apart more readily than the activated alumina support during fibril growth, resulting in fibril aggregates that are less ordered than the combed yarn aggregates but more ordered than the entangled fibril balls of bird nest aggregates. The oxide precursors used to generate the metal catalyst particles also affect the tendency of the aggregate-forming catalyst support to break apart. The more readily the oxide and support can form a mixed oxide at the interface between them, the more likely the support is to break apart.

Further details regarding the formation of carbon fibril aggregates may be found in the disclosure of Snyder et al., U.S. patent application Ser. No. 149,573, filed Jan. 28, 1988, and Moy et al., U.S. patent application Ser. No. 413,837 filed Sep. 28, 1989 ("Fibril Aggregates and Method of Making Same"), refiled as continuation application Ser. No. 855,122, Mar. 18, 1992, refiled as continuation application Ser. No. 08/284,917, filed Feb. 27, 1995, all of which are assigned to the same assignee as the invention here and are hereby incorporated by reference.

Improved fibril aggregates for use in the invention can be made in accordance with methods disclosed in U.S. patent application Ser. No. 07/887,307 (refiled as continuation application Ser. No. 08/284,742, refiled as continuation application Ser. No. 08/469,430), filed on even date by David Moy and Asif Chishti entitled "Improved Methods and Catalysts for the Manufacture of Carbon Fibrils" the disclosure of which is incorporated here by reference.

As a catalyst support, carbon fibril aggregates provide superior chemical and physical properties in porosity, surface area, separability, purity, catalyst loading capacity and chemical resistance to acids and bases. Carbon fibril aggregates have porosities as high as 8 ml/gm of aggregate support, high catalyst loading capacity, excellent separability from fluid phase owing to their resistance to attrition below a size of about 0.5 micron, surface areas of about 250 to about 300 $m^2$/gm and capable of being as high as 1000 $m^2$/gm, high compositional purity, i.e., freedom from contaminants.

Porosities of from about 2 to about 8 ml/gm and typically from about 5 to about 8 ml/gm, ensure increased accessibility to the active catalyst compound supported on the internal surfaces of the aggregate and confer a commensurate increase in the effective activity of the supported catalyst. Porosity is typically measured by evacuating all gases from a weighed sample of fibrils at a pressure<0.1 mm Hg; absorbing, in vacuo, a liquid, e.g., distilled water, suitable for such measurements just to the point of saturation; removing all liquid adhered to the fibril particles by filtering it through No. 50 Whatman filter paper with a water aspirator just to the formation of mud cracks in the filter cake; weighing the liquid-saturated fibril filter cake; and calculating the volume occupied by the liquid from the known weights of the fibrils, the absorbed liquid and the liquid density.

Carbon fibril aggregate catalyst supports have a high internal void volume that ameliorates the plugging problem encountered in various processes. Moreover, the preponderance of large pores obviates the problems often encountered in diffusion or mass transfer limited reactions. The high porosities ensure significantly increased catalyst life since more catalyst can be loaded onto the support.

The carbon fibril aggregate catalyst supports of the invention have improved physical strength and resist attrition. In normal service they attrit only to a size of about two microns. When severe attrition does occur the attritted particles are typically above about 0.5 micron. Further, attritted fibril aggregates tend to self-flocculate, such that even when reduced to particles of about 0.5 micron they self-flocculate forming larger size agglomerates, remaining separable as compared to other 0.5 micron sized particles.

Carbon fibril aggregates, which are highly graphitic, have a higher surface area than other synthetic graphites, typically 250–300 $m^2$/gm for fibril aggregates vs. 10 $m^2$/g for synthetic graphite. If surface areas higher than 250–300 $m^2$/gm are desired, fibril aggregates can be surface-oxidized to provide surfaces with surface areas above 1000 $m^2$/gm. An advantage of surface-oxidized carbon fibril aggregates over activated carbon is that only the surfaces of individual strands of carbon fibrils are modified and structural integrity of the aggregate remains intact, thereby providing increased surface area without any diminution in structural integrity.

The chemical purity of fibril aggregates has a positive effect on the selectivity of a supported catalyst since contamination-induced side reactions are minimized. Carbon fibril aggregates are essentially pure carbon with only small amounts of encapsulated catalytic metal compounds remaining from the process in which the fibril aggregate was formed. The encapsulated fibril-forming metal compound does not act as a catalyst poison or as a selectivity-affecting contaminant.

The combination of properties offered by fibril aggregates is unique. No known catalyst supports combine such high porosity, high surface area and high attrition resistance. The combination of properties offered by fibril aggregates is advantageous in any catalyst system amenable to the use of a carbon support. The multiple carbon fibrils that make up a carbon fibril aggregate provide a large number of junction points at which catalyst particles can adhere to multiple fibrils in the fibril aggregate. This provides a catalyst support that more tenaciously holds the supported catalyst. Further, carbon fibril aggregates permit high catalyst loadings per unit weight of fibril and this provides a greater reserve capacity of catalyst. Catalyst loadings are generally greater than 0.01 weight percent and preferably greater than 0.1 weight percent based on the total weight of the supported fibril-forming catalyst. Catalyst loadings greater than 50 weight percent of active catalyst based on the total weight of the supported catalyst are easily within the contemplation of the invention, i.e., loadings in excess of 100 weight percent based on the weight of the fibril aggregate-support of the invention, owing to the porosity of fibril aggregates and other factors discussed herein.

Because of their high purity, carbon fibril aggregates have the properties of high purity graphite and, therefore, exhibit high resistance to attack by acids and bases. This characteristic is advantageous since one path to regenerating catalysts is regeneration with an acid or a base. Regeneration processes can be used which employ strong acids or strong bases. Their high purity also allows them to be used in very corrosive environments.

METHOD OF MAKING SUPPORTED CATALYSTS

Supported catalysts are made by supporting a catalytically effective amount of a catalyst on the fibril aggregate. The term "on the fibril aggregate" embraces, without limitation, on, in and within the aggregate and on the constituent fibrils thereof. The aforesaid terms may be used interchangeably.

Three basic methods of preparing heterogeneous supported catalysts are adsorption, incipient wetness impregnation and precipitation. Supported catalysts may be prepared by either incorporating the catalyst onto the aggregate support or by forming it in situ and the catalyst may be either active before it is placed in the aggregate or activated in situ.

Desirable active catalysts are the platinum group (ruthenium, osmium, rhodium, iridium, palladium and platinum or a mixture thereof) and, preferably, palladium and platinum or a mixture thereof.

The catalyst, such as a coordination complex of a catalytic transition metal, such as palladium, rhodium or platinum, and a ligand, such as a phosphine, can be adsorbed by slurrying the fibril aggregate in a solution of the catalyst or catalyst precursor for an appropriate time for the desired loading.

In impregnation by incipient wetness, a solution of the catalyst or catalyst precursor is absorbed by the dry fibril aggregate just to the point of saturation. Since the internal void volumes are very high (up to 8 cc/g with water) loadings in excess of 2–3 g of active catalyst/g of fibril aggregate can be obtained (e.g., 2.9 g $Zn(OAc)_2$/g BN fibril aggregate). Multiple impregnations, can result in even higher loadings.

Alternatively, the catalyst or a catalyst precursor can be precipitated directly onto the surfaces of the aggregate. This method works well with oxide and mixed oxide catalysts. For example, a metal oxide can be first deposited on the fibril aggregate and the active catalyst then deposited in a second step. This deposition can be accomplished by loading a precursor of the metal oxide or catalyst by incipient wetness followed by addition of a precipitating agent, e.g., a base. Or, the mixed oxide catalyst can be deposited analogously in a single step.

Aggregate-supported catalytic metal oxides and hydrated oxides can be prepared by precipitating them from aqueous solutions of water-soluble salts of the metals, such as by adjusting the pH of the solution. The corresponding sulfides can be made from these oxides and hydrated oxides. U.S. patent application Ser. No. 07/887,307 (refiled as continuation application Ser. No. 08/284,742, refiled as continuation application Ser. No. 08/469,430), filed on even date by David Moy and Asif Chishti entitled "Improved Methods and Catalysts for the Manufacture of Carbon Fibrils" the disclosure of which is incorporated here by reference, describes such precipitation in the context of fibril aggregate-supported catalysts for making fibrils and fibril aggregates.

Fibril aggregates can be wetted with a catalyst precursor, such as a metal cation or metal complex in a suitable solvent system, dried, and then wetted with an activator, such as a suitable anion in a suitable solvent system or an acid or base in a suitable solvent, so as to produce the catalyst in situ within the fibril aggregate structure. As an alternative, the sequence may be reversed.

Still another method of making a supported catalyst is by adsorbing a catalyst precursor, such as a cation or metalate of a catalytic transition metal in solution, onto the fibril aggregate and then reducing or oxidizing the precursor to the catalyst, such as to the metal or metal oxide.

The catalyst can also be coprecipitated onto the fibril aggregate along with another material, such as a material that is compatible with both the catalyst and the fibril aggregate where the catalyst is not compatible with the fibril aggregate. This technique opens the range of candidate catalysts for support by the fibril aggregates. For instance, a ferric oxide ($Fe_2O_3$) catalyst can be coprecipitated with alumina ($Al_2O_3$) or molybdena ($MoO_3$) to form a coprecipitated mixed oxide catalyst, which may be reduced prior to the intended reaction, supported on the fibril aggregate.

Further, the fibril aggregate support may be pretreated with an acid and/or base before being imparted with catalytic activity.

Carbon fibril aggregates can be used to support catalysts other than those which are normally supported on carbon. A cosupport such as alumina, magnesia, silica, silica-alumina, silica-magnesia or a zeolite can be deposited or formed within a fibril aggregate and provide a support for a catalyst that is amenable to use only with the cosupport and still be effective because of the porosity of the fibril aggregate. By the same token a catalyst and a compatibility material can be coprecipitated on the fibril aggregate with the catalyst not otherwise being capable of attachment to a fibril aggregate. In other words, the porosity of fibril aggregates permit them to hold cosupport or coprecipitated catalyst material and still have sufficient porosity to provide access to reactant(s), product(s) and heat flow. Because of the very low bulk densities of carbon fibril aggregates (0.08–0.15 g/cc) and the resistance to attrition to less than 0.5 micron, the resulting cosupported or mixed oxide catalysts are suitable for fluidized bed or other catalytic processes requiring attrition resistance.

In addition, the surfaces of the individual fibrils in the aggregate can be modified in order to either increase surface area or to modify their chemical properties to make them amenable to support of an even broader range of catalyst materials. It is also possible, because of the extreme porosity to apply multiple layers of materials to these surfaces.

METHODS OF USING SUPPORTED CATALYSTS

Carbon fibril aggregates are candidates for use as catalyst supports for catalysts that heretofore utilized carbon as a support material. These catalysts may catalyze substitution—nucleophilic, electrophilic or free radical; addition—nucleophilic, electrophilic, free radical or simultaneous; β-elimination; rearrangement—nucleophilic, electrophilic or free radical; oxidation; or reduction reactions. The foregoing reactions are defined in March, J. Advanced Organic Chemistry (3rd ed., 1985) at pp. 180–182. See also Grant and Hackh's Chemical Dictionary (5th ed. 1987). More particularly, carbon fibril aggregates of the invention may be used as catalyst supports for catalysts for slurried liquid phase precious metal hydrogenation or dehydrogenation catalysis, Fischer-Tropsch catalysis, ammonia synthesis catalysis, hydrodesulfurization or hydrodenitrogenation catalysis, the catalytic oxidation of methanol to formaldehyde, and fibril- and/or fibril aggregate-forming catalysts. Typical heterogeneous catalytic reactions and the catalysts that are candidates for support on fibril aggregates are set forth in Table I below.

| Reaction | Catalyst |
|---|---|
| Hydrogenation | |
| Olefin → alkane | Pt, Pd, Rh, Ru |
| $3H_2 + N_2 \rightarrow 2NH_3$ | Fe |
| $2H_2 + CO \rightarrow CH_3OH$ | $Cu^+/ZnO$ |
| Heptane → toluene + $4H_2$ | Pt |
| Acetone + $H_2$ → 2-propanol | Pt, Copper chromite |
| $H_2$ + aldehyde → alcohol | Pt, Pd, Rh, Ru |
| nitrobenzene → aniline | Pd |
| ammonium nitrate → hydroxylamine | Pd |
| alkene → alkane substituted alkene → substituted alkane | Pd, Pt, Rh, Ru |
| Dehydrogenation | |
| 2 HOCH₂CH₂OH → 2,3-dihydrodiorin + $H_2 + H_2O$  | Pt |
| cyclohexanone → phenol + $H_2$ | Pt |
| Aromatization | |
| 2a,3,4,4a-tetrahydropyraclone → Pyracene 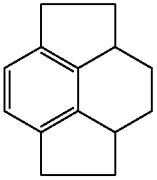 | Pd, Pt, Rh |
| Polymerization | |
| $C_2H_4$ → linear polyethylene | $Cr^{2+}/SiO_2$ |
| Olefin metathesis | |
| $2C_3H_6 \rightarrow C_2H_4 + CH_3CH=CHCH_3$ | $Mo^{4+}/Al_2O_3$ |
| Oxidation | |
| $CH_3OH + \frac{1}{2}O_2 \rightarrow CH_2O + H_2O$ | $Fe_2O_3 \cdot MoO_3$ |
| $H_2O + CO \rightarrow H_2 + CO_2$ | $Fe_3O_4$, Ni, CuO/ZnO |
| $\frac{1}{2}O_2 + CH_2CH_2 \rightarrow CH_3CHO$ | PdCl and similar salts of noble metals |
| $RCH_2OH \rightarrow RCHO + H_2$ | Pt |
| Glucose → d-glucuronic acid | Pt |
| Oligomerization | |
| dimethylacetylene dicarboxylate → hexamethyl mellitate | Pd |
| Isomerization | |
| 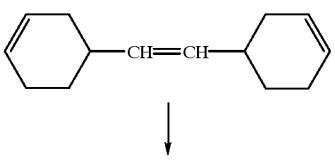 | Pd |

-continued

| Reaction | Catalyst |
|---|---|
| 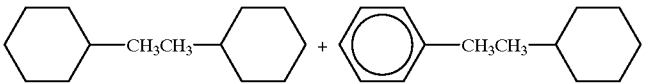 | |
| Carbonylation | |
| $CO + CH_3OH \rightarrow CH_3COOH$ | Rh |
| Decarbonylation | |
| 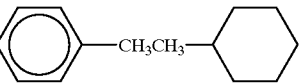 | Pd |
| 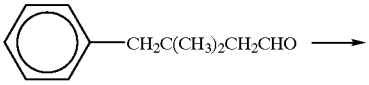 | |
| Hydrosilation | |
| $SiH(CH_3)_3$ + cyclooctadiene-1,3 → 3-trimethylsilyl-cyclooctene | Pt |

The process of performing a heterogeneous catalytic chemical reaction in fluid phase with supported catalysts of the invention comprises contacting a reactant with a supported catalyst in fluid phase under suitable reaction conditions. The process may be a batch process or a continuous process, such as a plug flow process or a gradientless process, e.g., a fluidized bed process. The supported catalysts of the invention are particularly useful in catalytic processes where the reaction environment subjects the supported catalyst to mechanical stresses such as those using liquid phase slurry reactors, trickle bed reactors or fluidized bed reactors. The attrition resistance and high loading capability of the supported catalyst are particularly beneficial in these environments.

In a batch process, the reactant(s) are reacted in the presence of the supported catalyst in a reaction vessel, preferably under agitation, and then the supported catalyst is separated from the reactant(s)/product(s) mixture by suitable means for reuse, such as by a filter or a centrifuge.

The FIGURE schematically illustrates a batch hydrogenation process 1. Supported catalyst is placed in a batch reaction vessel 10 to which hydrogen and reactant are added. The vessel is closed and the hydrogenation reaction performed under agitation. On completion of the reaction, the vessel contents are passed through line 14 to a filter 20 where the supported catalyst is separated and returned to the reaction vessel 10 via return line 22 and the remainder of the vessel contents passed to the next stage of the process via line 24.

In a plug flow process, the reactant(s) pass through a stationary bed of supported catalyst, such that the concentration of product(s) increases as the reactant(s) pass through the catalyst bed. Any supported catalyst that becomes entrained in this flow can be separated by suitable means from the reactant(s)/product(s) stream and recycled into the bed.

In a moving bed or fluidized bed process, the supported catalyst is fluidized or entrained with the flow of reactant(s) in the process. The supported catalyst flows concurrently with the reactant(s)/product(s). At the end of the reaction step, any entrained supported catalyst is separated from the unreacted reactant(s)/product(s) stream, such as by filter, centrifuge or cyclone separator, and recycled to the beginning of the reaction step.

In a fluidized bed process, a bed of the supported catalyst is fluidized but remains within the bounds of a fixed zone as the reactant(s) move through the bed and react to form product(s). In this situation any supported catalyst that becomes entrained in the reactant(s)/product(s) stream may be separated by suitable means and returned to the fluidized bed.

In a further form of continuous process, the supported catalyst moves counter-current to the flow of reactant(s). For example, the reactant may be introduced as a gas into the base of a vertical reaction vessel and removed from the top as product(s). The supported catalyst is introduced at the top of the vessel and cascades turbulently downwardly through the upward gas flow to be withdrawn from the bottom for recycle to the top of the vessel. Any supported catalyst entrained in the gas flow exiting the vessel could be separated and recycled to the top of the vessel for recycle into the reaction vessel.

The fibril aggregate supports of the invention can also be used as supports for what would otherwise be homogeneous catalysis, a technique sometimes called support liquid phase catalysis. Their use as supports permits homogeneous catalytic processes to be run using heterogeneous catalysis techniques. In supported liquid phase catalysis, the reactant(s) and catalyst are molecularly dispersed in the liquid phase that is supported within the structure of the fibril aggregate.

The high internal volume of fibril aggregates, as evidenced by their porosity, permits them to be loaded with a liquid phase catalyst, much like a sponge, and used as a catalyst, but in a solid particle form. Each catalyst-loaded fibril aggregate can be viewed as a microreactor in that the interior of the aggregate is loaded with a continuous liquid phase containing catalyst or a plurality of droplets of catalyst in solution. Consequently, the aggregate behaves both as a solid particle for material handling purposes and as a homogeneous liquid catalyst for reaction purposes. The usefulness of carbon fibril aggregates is aided in this regard by their chemical stability. The advantages in using homogeneous catalyst-loaded fibril aggregates are the ease of separating the catalyst from the product stream, easy in carrying out the process, equipment sizing and in avoiding corrosion in the condensed liquid phase.

Fibril aggregates are amendable to use as supports in the catalysis of substitutions, additions, β-eliminations, rearrangements, oxidations and reductions. More specifically, they are useful in hydroformylation and carbonylation reactions and the Wacker process.

In carbonylation reactions, a catalyst-loaded fibril aggregate is prepared by absorbing a solution of the carbonylation catalyst, such as rhodium chloride and triphenyl phosphine, in a higher boiling point solvent, such as mesitylene or pseudocumene, into dry fibril aggregates, such as bird nest aggregates.

The carbonylation reaction is carried out by contacting a vapor phase feedstock with the catalyst at appropriate temperatures and pressures. The feedstock mixture may be, e.g., carbon monoxide, methyl acetate, methyl iodide and solvent. The feedstock is absorbed and molecularly dispersed in the catalyst solution and reacts in the liquid phase. The reaction can be carried out in a slurry phase reaction as previously described or in a fixed bed reaction.

The products of reaction, such as acetic anhydride and/or acetic acid and byproducts, are removed from the fibril aggregate particles by vaporization or filtration.

In the Wacker Process, a catalyst-loaded fibril aggregate is prepared by absorbing a catalyst, such as palladium chloride, copper chloride, potassium chloride or lithium chloride, in a solvent such as water, into dry fibril aggregates. The loaded catalyst is then placed into a slurry phase or fixed bed reaction and vapor phase reactants, such as ethylene, oxygen and hydrogen chloride, are passed through the bed at appropriate partial pressures and temperatures. The products, such as acetaldehyde and water can be separated from the catalyst by vaporization or filtration.

EXAMPLES

Examples I through VII describe the preparation of supported catalysts in accordance with the invention for various chemical processes and their use in those processes.

EXAMPLE I

This example describes the preparation by incipient wetness of a fibril aggregate-supported catalyst for a liquid phase slurry, precious metal hydrogenation and the use of the catalyst in the hydrogenation of phenol to cyclohexanone/cyclohexanol.

A sample of BN fibril aggregates (void volume of 7.0 cc $H_2O/g$) is washed extensively with 6 N HCl, distilled water, and is then dried. 10.0 g of the dry aggregates are added to a 1 liter 2-neck flask equipped with a 100 cc long-stem addition funnel and a stopcock attached to a vacuum source. The fibril sample is degassed at 0.1 mm Hg. Eighty cubic centimeters of 0.0135M solution of $PdCl_2$ (from AESAR) in 6 N HCL is added to the addition funnel. While still under vacuum, the solution is slowly and carefully added to the dry, degassed fibrils. The flask is shaken frequently to mix the partially wetted fibrils as the addition is performed. Addition is continued until the point of saturation is just reached. A total of 72.5 cc is added. The flask is then placed onto a rotary evaporator and is dried at 0.1 mm Hg and 80° C. for several hours. The dried catalyst is reduced by reaction with 5% $H_2$ in a 2 inch quartz tube at 200° C. until the gaseous effluent no longer tests positive for $Cl^-$. Nominal loading on the catalyst is 1.1% palladium by weight.

The test for catalytic activity is performed in a 50 cubic centimeter stainless steel autoclave at 160° C. and a total pressure of 5 atmosphere. Products are analyzed on a Varian 3700 gas chromatograph using a capillary SPB-5 column. Ten grams of phenol (Aldrich Chemical, ACS Reagent) is loaded in the autoclave with 0.2 g of the catalyst. The autoclave is sealed and all air is removed by purging twice with argon. The autoclave is then heated under an atmosphere of $H_2$ with stirring (800 rpm) to 100° C., after which the pressure regulator for the system is set to 5 atm and the temperature controller set for 160° C. On reaching these conditions, reaction is allowed to proceed for 15 min. A 1.0 cc sample is withdrawn every 5 min. for analysis. The rates of formation for cyclohexanone and cyclohexanol are 16.0 and 0.12 g/g cat-s or liters per gram of catalyst-second, respectively.

EXAMPLE II

This example describes the preparation of a fibril aggregate-supported catalyst for the Fischer-Tropsch process and the use of the catalyst in that process.

Ten grams of BN fibril aggregates (void volume, 7.0 cc/g) is dispersed with 600 cubic centimeters of deionized water for 2 minutes in a Waring blender to form a thick paste. This is then slurried with an additional 1 liter in a 3 liter 3-neck indented flask fitted with a top stirrer. One hundred twenty grams of 41% $Fe(NO_3)_3$ from Blue Grass Chemical is added to the slurry and, with vigorous stirring, is neutralized with a solution of 20 weight percent potassium carbonate to a pH ≧7. The slurry is filtered and washed lightly and then is dried at 160° C. in a convection oven. Nominal loading of the catalyst is 1.1 g of iron per gram of carbon fibril aggregate.

The catalyst is ground and reduced in $H_2$ at 350° C. for 6 hrs. It is added to a fluidized bed reaction at 340° C. and charged with a 6/1ratio of $H_2$/CO at 2.5 MPa and at sufficient velocity to maintain a fluidized bed. After equilibrium is reached, analysis by gas chromatography of the liquid product collected downstream is:

| Fraction | $C_5-C_{10}$ | $C_{11}-C_{18}$ |
|---|---|---|
| Olefins | 70 | 60 |
| Paraffins | 13 | 15 |
| Oxygenates | 12 | 10 |
| Aromatics | 5 | 15 |

EXAMPLE III

This example describes the preparation of a fibril aggregate-supported $Fe_2O_3$/MgO catalyst for an ammonia synthesis process and the use of the catalyst in an ammonia synthesis process.

Magnesia (Martin Marietta MagChem 50) (29.6 grams) is slurried with deionized water at 80° C. for 3 hrs. and is then allowed to cool. BN fibril aggregates (3.3 grams) (void volume 7.0, surface area 290 $M^2$/g) is added to the MgO/$Mg(OH)_2$ slurry and the mixture stirred in a Waring blender for 2 min. 67.6 g of a 41% solution of $Fe(NO_3)_3$ in deionized water is mixed with a solution of 2.17 g ammonium paramolybdate in deionized water, yielding a clear, orange-brown solution. This solution is added to the MgO/$Mg(OH)_2$ fibril aggregate slurry with vigorous mixing at a steady dropwise rate. The resulting slurry is black. The slurry is filtered and washed twice with 1 N ammonium acetate by reslurrying and refiltering. The filter cake is dried at 160° C. for 18 hrs., then calcined at 400° C. for 4 hrs. The nominal composition of the calcined catalyst is: 33% $Fe_2O_3$, 6.5% $MoO_3$, 48.5% MgO, 12% fibril aggregate.

The catalyst is reduced in a $H_2$ stream by gradually increasing the temperature from 75° C. to 425° C. over a 12 hr. period, followed by 24 hrs. at 425° C. At the end of this time, heat is removed. When the temperature reaches ambient temperature, $H_2$ is purged with argon. The catalyst is then exposed to a 10% $CO_2$/argon gas stream to partially reoxidize the reduced Fe, which is otherwise pyrophoric.

The catalyst is tested for ammonia synthesis in a fixed bed reactor 8.0 g (23.8 cc) of catalyst is loaded in a ¾" tube. Reaction is carried out at 480° C. and 25 MPa total pressure with a 3/1 ratio of $H_2/N_2$. The exit gas contains 8% $NH_3$, 23% $N_2$ and 69% $H_2$. This corresponds to a 15% conversion to $NH_3$.

EXAMPLE IV

This example describes the preparation of a fibril aggregate-supported catalyst for a hydrodesulfurization process by pore filling and the use of the catalyst in a hydrodesulfurization process.

Ten grams of BN carbon fibril aggregates (void volume 7 cc/g) is dispersed in a mixture of 600 cc of a solution that is 0.44 M in $Co(NO_3)_2 \cdot 6H_2O$ (25.75% CoO) and 0.20 M in ammonium paramolybdate (81.53% $MoO_3$) in a Waring blender for 2 minutes. The slurry is filtered and without further washing, dried at 125° C. The dried catalyst is calcined at 230° C. for 6 hours. The catalyst exhibits a nominal loading of 2.3 g CoO, 14.1 g $MoO_3$ (6/1 ratio of $MoO_3$/CoO) and 10.0 g fibril aggregates.

The catalyst is activated by reduction at 325° C. with a gas mixture containing 2.5% $H_2S$ in $H_2$ for 2 hrs.

0.1 g of catalyst is charged into a 500 cc stirred autoclave with 300 cc of 1 vol % solution of thiophene in hexadecane. The reactor is charged to 80 atm with $H_2$ and the hydrodesulfurization reaction is carried out at 300° C. One cc samples are withdrawn and analyzed at 5 min. intervals and a pseudo first order rate constant for disappearance of thiophene is determined to be $4.5 \times 10^{-3}$ L/g cat-s.

EXAMPLE V

This example describes the preparation of a fibril aggregate-supported catalyst for a carbonylation process and the use of the catalyst in a carbonylation process.

A homogeneous catalyst solution having 0.0015M of $RhCl_3$, 0.0005 M of $Cr(CO)_6$ and 0.005 M of triphenyl phosphine dissolved in pseudocumene is absorbed into the pores of 10 g of BN fibril aggregates (void volume, 7.0 cc/g, surface area 290 $m_2$/g.

The catalyst solution as a supported liquid phase within the fibril aggregates is loaded into a fixed bed reactor. The pressure in the reactor is increased and controlled at 500 psig with CO and the temperature is increased to 200° C. A gas mixture comprising MeOAc, MeI and CO saturated with pseudocumene at 200° C. and 500 psig is prepared such that the final composition of the gas stream is: 64% CO, 25% MeOAc, 10% MeI, 1% pseudocumene. The gas mixture is fed into the fixed bed reactor whereupon MeOAc, MeI and CO dissolve in the supported liquid phase within the fibril aggregates and react to form acetic anhydride and acetic acid. Products are removed from the reactor by vaporization.

EXAMPLE VI

This example describes the preparation of a fibril aggregate-supported catalyst for the heterogeneous Wacker process and the use of the catalyst in a heterogeneous Wacker process.

A homogeneous solution, 0.01 M in $PdCl_2$, 1.0 M in $CuCl_2$ and 0.001 M in LiCl, is absorbed into the pores of 10.0 g BN fibril aggregates (void volume, 7.0 cc/g, surface area 290 m2/g).

The catalyst (83 cc) is loaded into a 1" fixed bed reactor. A gas stream comprising 60% stream, 31% $C_2H_4$ and 9% $O_2$ is fed at 110° C. and 60 psig at a total GHSV of 360. Residence time is approximately 10 sec. The effluent contains 18% $CH_3CHO$, 16% $C_2H_4$, 1% $O_2$ and the balance, steam.

EXAMPLE VII

This example describes the preparation of a fibril-supported catalyst for the oxidation of methanol to formaldehyde and the use of the catalyst in that process.

A catalyst is prepared by absorbing a solution that is 0.004 M in ammonium paramolybdate $[(NH_4)_6Mo_7O_24 \cdot 4H_2O]$, 0.015 M in $Fe(NO_3)_3$ and 0.5 M in citric acid into 10.0 g BN fibril aggregates (void volume 7.0 cc/g, surface area 290 $m^2$/g). The impregnated catalyst is dried at 110° C. and calcined at 240° C. for 4 hrs. Nominal composition of the catalyst is 0.65% $Fe_2O_3$, 2.3% $MoO_3$ and 97% Fibril Aggregates.

The reactor is a quartz tube, 32 mm OD×1000 mm long fitted with a porous fritted glass disc (10–20 micron). The bed length is 425 mm. The process is carried out at 240° C. and atmospheric pressure with a gas stream comprising 6% MeOH/94% air (vol) at a total gas rate of 125 l/hr. Analysis of products by gas chromatography shows a 98% conversion of MeOH with a selectivity to $CH_2O$ of 96%. CO (2.5%), $CO_2$ (0.2%) and methyl formate (0.5%) are also detected.

What is claimed is:

1. A process for performing a catalytic chemical reaction in fluid phase comprising contacting at least one reactant in fluid phase with a supported catalyst that comprises:
   (a) a catalyst support comprising a carbon fibril aggregate, said fibril aggregate comprising a plurality of carbon fibrils; and
   (b) a catalytically effective amount of a catalyst supported on said aggregate,
   wherein said catalyst is in an amount greater than 0.1 weight percent based on the total weight of the supported catalyst, wherein said aggregate has a diameter between 0.05 and 50 microns and a length between 0.1 and 1000 microns, and a porosity from about 2 ml/gm to about 8 ml/gm.

2. A process as recited in claim 1, wherein said carbon fibrils have an outer region of multiple essentially continuous, generally parallel layers of ordered graphitic carbon atoms.

3. A process as claimed in claim 1, wherein the carbon fibril aggregate is substantially free of micropores having a diameter less than 20 Å.

4. A process as claimed in claim 1, wherein the fibrils have a fishbone morphology.

5. A process as claimed in claim 1, wherein said carbon fibril aggregate has a surface area greater than about 250 $m^2$/gm.

6. A process as claimed in claim 1, wherein said catalytic chemical reaction converts one or more fluid phase reactants to one or more fluid phase products.

7. A process for performing a catalytic chemical reaction in fluid phase comprising contacting at least one reactant in fluid phase with a supported catalyst that comprises:
(a) a catalyst support comprising a carbon fibril aggregate, said fibril aggregate comprising a plurality of carbon fibrils, said fibrils having an external diameter of about 3.5 to 75 nanometers and a length to diameter ratio of at least 5, and;
(b) a catalytically effective amount of a catalyst supported on said aggregate,
wherein said catalyst is in an amount greater than 0.1 weight percent based on the total weight of the supported catalyst, wherein said aggregate has a diameter between 0.05 and 50 microns and a length between 0.1 and 100 microns, and a porosity from about 2 ml/gm to about 8 ml/gm.

8. A process as recited in claim 7 wherein said process further comprises separating said supported catalyst from one or more products of said reaction.

9. A process as recited in claim 7 wherein said process further comprises recycling said supported catalyst to said process for contacting said reactant after separating the supported catalyst from said one or more products.

10. A process as recited in claim 7 wherein said reaction is conducted in the liquid phase.

11. A process as defined by claim 7 wherein said reaction is conducted in the gas phase.

12. A process as recited in claim 7 wherein the reaction is conducted in a liquid phase slurry reactor, a trickle bed reactor or a fluidized bed reactor.

13. A process as recited in claim 7, wherein said carbon fibrils have an outer region of multiple essentially continuous, generally parallel layers of ordered graphitic carbon atoms.

14. A process as claimed in claim 7, wherein the carbon fibril aggregate is substantially free of micropores having a diameter less than 20 Å.

15. A process as claimed in claim 7, wherein the fibrils have a fishbone morphology.

16. A process as claimed in claim 7, wherein said carbon fibril aggregate has a surface area greater than about 250 m$^2$/gm.

17. A process as claimed in claim 7, wherein said catalytic chemical reaction converts one or more fluid phase reactants to one or more fluid phase products.

18. A process for performing a catalytic chemical reaction comprising:
(a) introducing a reactant in vapor phase into a reaction zone containing a fibril aggregate-supported catalyst that comprises:
(b) a catalyst comprising a carbon fibril aggregate, said fibril aggregate comprising a plurality of carbon fibrils, and
(c) a catalytically effective amount of an active catalyst supported on said aggregate, the active catalyst being contained within a liquid phase within said aggregate; and
(d) absorbing the reactant into said liquid phase to conduct said reaction, wherein said catalyst is in an amount greater than 0.1 weight percent based on the total weight of the supported catalyst wherein said aggregate has a diameter between 0.05 to 50 microns and a length between 0.1 and 1000 microns, and a porosity from about 2 ml/gm to about 8 ml/gm.

19. A process as recited in claim 18, wherein said carbon fibrils have an outer region of multiple essentially continuous, generally parallel layers of ordered graphitic atoms.

20. A process as claimed in claim 18, wherein a preponderance of said fibrils have an external diameter of about 3.5 to 75 nanometers and a length to diameter ratio of at least 5.

21. A process as claimed in claim 18, wherein the carbon fibril aggregate is substantially free of micropores having a diameter less than 20 Å.

22. A process as claimed in claim 18, wherein said carbon fibril aggregate has a surface area greater than about 250 m$^2$/gm.

23. A process as claimed in claim 18, wherein said catalytic chemical reaction converts one or more fluid phase reactants to one or more fluid phase products.

24. A process for performing a catalytic chemical reaction in fluid phase comprising contacting at least one reactant in fluid phase with a supported catalyst that comprises:
(a) a catalyst support comprising a carbon fibril aggregate, said fibril aggregate comprising a plurality of carbon fibrils; and
(b) a catalytically effective amount of a catalyst supported on said aggregate, wherein said catalyst is in an amount greater than 0.1 weight percent based on the total weight of the supported catalyst, wherein said fibril aggregate has a porosity from about 2 to about 8ml/gm.

25. A process for performing a catalytic chemical reaction in fluid phase comprising contacting at least one reactant in fluid phase with a supported catalyst that comprises:
(a) a catalyst support comprising a carbon fibril aggregate, said fibril aggregate comprising a plurality of carbon fibrils, said fibrils having an external diameter of about 3.5 to 75 nanometers and a length to diameter ratio of at least 5, and;
(b) a catalytically effective amount of a catalyst supported on said aggregate,
wherein said catalyst is in an amount greater than 0.1 weight percent based on the total weight of the supported catalyst, wherein said fibril aggregate has a porosity from about 2 to about 8 ml/gm.

26. A process for performing a catalytic chemical reaction comprising:
(a) introducing a reactant in vapor phase into a reaction zone containing a fibril aggregate-supported catalyst that comprises:
(b) a catalyst supported comprising a carbon fibril aggregate, said fibril aggregate comprising a plurality of carbon fibrils, and
(c) a catalytically effective amount of an active catalyst supported on said aggregate, the active catalyst being contained within a liquid phase within said aggregate; and
(d) absorbing the reactant into said liquid phase to conduct said reaction, wherein said catalyst is in an amount greater than 0.1 weight percent based on the total weight of the supported catalyst, wherein said fibril aggregate has a porosity from about 2 to about 8 ml/gm.

27. A process for performing a catalytic chemical reaction in fluid phase comprising contacting at least one reactant in fluid phase with a supported catalyst that comprises:
(a) a catalyst support comprising a carbon fibril aggregate, said fibril aggregate comprising a plurality of carbon fibrils, said carbon fibrils having an outer region of multiple essentially continuous, generally parallel layers of ordered graphitic carbon atoms; and
(b) a catalytically effective amount of a catalyst supported on said aggregate,
wherein said catalyst is in an amount greater than 0.1 weight percent based on the total weight of the supported catalyst.

28. A process for performing a catalytic chemical reaction in fluid phase comprising contacting at least one reactant in fluid phase with a supported catalyst that comprises:

(a) a catalyst support comprising a carbon fibril aggregate, said fibril aggregate comprising a plurality of carbon fibrils, said fibrils having an external diameter of about 3.5 to 75 nanometers, a length to diameter ratio of at least 5, and an outer region of multiple essentially continuous, generally parallel layers of ordered graphitic carbon atoms; and (b) a catalytically effective amount of a catalyst supported on said aggregate, wherein said catalyst is in an amount greater than 0.1 weight percent based on the total weight of the supported catalyst.

29. A process as recited in claim 28, wherein said parallel layers are disposed substantially parallel to the central axis of said fibril.

30. A process for performing a catalytic chemical reaction comprising:

(a) introducing a reactant in vapor phase into a reaction zone containing a fibril aggregate-supported catalyst that comprises:

(b) a catalyst support comprising a carbon fibril aggregate, said fibril aggregate comprising a plurality of carbon fibrils, said carbon fibrils having an outer region of multiple essentially continuous, generally parallel layers of ordered graphitic atoms; and (c) a catalytically effective amount of an active catalyst supported on said aggregate, the active catalyst being contained within a liquid phase within said aggregate; and (d) absorbing the reactant into said liquid phase to conduct said reaction, wherein said catalyst is in an amount greater than 0.1 weight percent based on the total weight of the supported catalyst.

31. A process as claimed in claim 30, wherein said parallel layers are disposed substantially parallel to the central axis of said fibril.

* * * * *

UNITED STATES PATENT AND TRADEMARK OFFICE
CERTIFICATE OF CORRECTION

PATENT NO. : 6,159,892　　　　　　　　　　　　　　　　　　　　　Page 1 of 1
DATED　　　 : December 12, 2000
INVENTOR(S) : Moy et al.

It is certified that error appears in the above-identified patent and that said Letters Patent is hereby corrected as shown below:

<u>Column 17,</u>
Line 15, change "100" to -- 1000 --.

Signed and Sealed this

Twenty-fifth Day of December, 2001

*Attest:*

JAMES E. ROGAN
*Attesting Officer*　　　　*Director of the United States Patent and Trademark Office*